UNITED STATES PATENT OFFICE.

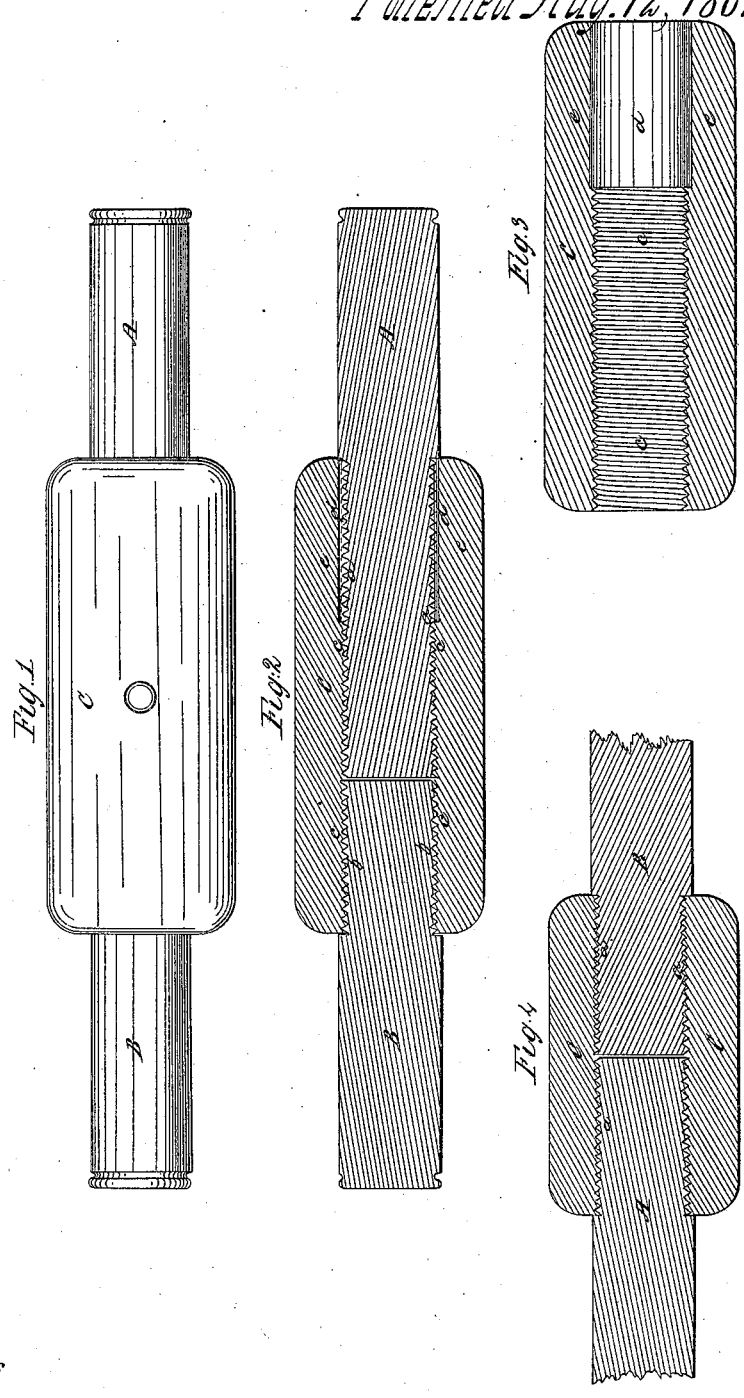

GEORGE N. TROWBRIDGE, OF ROLLINSFORD, NEW HAMPSHIRE.

IMPROVEMENT IN SHAFT-COUPLINGS.

Specification forming part of Letters Patent No. 36,181, dated August 12, 1862.

*To all whom it may concern:*

Be it known that I, GEORGE N. TROWBRIDGE, a citizen of the United States of America, and a resident of Rollinsford, in the county of Strafford and State of New Hampshire, have invented a new and useful Improvement in Couplings for Shafts; and I do hereby declare the same to be fully described in the following specification, and represented in the accompanying drawings, of which—

Figure 1 is a side view of my improved coupling as connecting two shafts. Fig. 2 is a longitudinal section of it. Fig. 3 is a longitudinal section of the coupling-nut. Fig. 4 exhibits a longitudinal section of a screw-coupling of the ordinary kind on which my invention is engrafted, and constitutes my improvement.

In the last-named figure, A and B are the two shafts, on each of which a male screw is cut, as shown at $a$ $a$. A tubular nut, C, screws on the two screws, and thus connects or couples the two shafts together. With such a construction of parts it is very difficult, if not impossible, to separate from a long line of shafting composed of several shafts so coupled together any one of them without disturbing the others. One purpose of my invention is to enable such to be accomplished. Another purpose is to cover and protect each two adjacent male screws of the coupled shafts.

In carrying out my invention the male screw of one shaft is made equal in length to and that of the other of a less length than the female screw of the coupling-nut; and, furthermore, the shaft-coupling nut is or may be constructed with a cylindrical shaft-recess, in order that it may not only cover and protect the threads of the entire screw, but may pass on the shaft like a sleeve while the coupling-nut may be in the act of being screwed backward for the purpose of enabling the shafts to be disconnected from one another.

In Figs. 1 and 2, A and B denote the shafts, and C their coupling-nut. The shaft A is provided with a male screw whose length corresponds to that of the female screw $c$ of the coupling-nut. The other shaft, B, is provided with a male screw, $b$, whose length is half or less than half of that of the female screw $c$. Furthermore, in the rear of the screw $c$ there is made within the coupling-nut a cylindrical recess, $d$, having a diameter corresponding with or a little greater than that of the shaft A, and a length about equal to one-third the length of the coupling. It is intended that the portion of the coupling which is concentric with the said recess shall cover and protect the threads of the rear half of the screw $a$ while the two shafts are connected together, and this it will do in the manner as shown in Fig. 2. By screwing back the coupling on the shaft A until the screw $b$ may become entirely uncovered or unscrewed from the coupling-nut, the shaft B will be disconnected from the shaft A, and may be readily removed therefrom.

The coupling-nut may be constructed without the recess $d$ and with a length double or about double that of the screw $b$; but in this case a large portion of the screw $a$ will remain uncovered and unprotected by the nut when the two shafts are coupled together. This exposure of the screw renders water, dirt, and extraneous matters liable to collect on it from time to time, either or all of which would be apt to impede its correct operation or be injurious to the screw. The sleeve $e$, or that part of the coupling-nut which surrounds the recess $d$, is thus an important addition to the nut, and is productive of useful effects.

I claim—

1. My improved shaft screw-coupling, having the male screw of one shaft equal in length to and that of the other of a less length than the female screw of the coupling-nut.

2. My improved shaft-coupling as constructed with the chamber or shaft-recess $d$, and in other respects substantially as described.

GEO. N. TROWBRIDGE.

Witnesses:
CHARLES MALLOY,
JNO. G. PIKE.